Patented Oct. 12, 1937

2,095,614

UNITED STATES PATENT OFFICE 2,095,614

NONHARDENING CEMENT

Silvio Pellerano, Brooklyn, N. Y.

No Drawing. Application August 24, 1934,
Serial No. 741,331

4 Claims. (Cl. 106—8)

My invention relates to adhesive cements for general use as such, or as binding material, putty or a sealing compound, and more particularly to a cement peculiarly adapted to act efficiently for setting tiles made of clay, glass, cement, marble or other material employed for this purpose.

Ordinarily, tiles are set by means of inorganic cement mortars, such as a mixture of Portland cement, lime and sand, necessitating selection or careful preparation of the surfaces on which the tiles are to be fixed, in order to retain the mortar. The primary object of this invention is to provide a cement which will enable one to set tiles on surfaces of various substances such as wood, steel, cement, fibre boards, plaster, concrete, etc. without previous special treatment or preparation of said surfaces.

For this purpose it is desirable that such a cement should preserve a uniform consistency with little or no volume changes, when subjected to varying climatic conditions; it should be waterproof and non-corrosive, should keep its plasticity and workability for long periods of time and should be a strong adhesive for this type of work, and retain this property. The above qualities in an adhesive are also desirable for its use as a sealing compound.

An important object of my invention therefore, is to provide a cement having the characteristics above outlined, which will be strong enough as an adhesive to accomplish the desired cementing function, will remain workable for long periods of time with little or no volume changes though subjected to variable climatic conditions, and which will also be waterproof and non-corrosive, and will adhere to surfaces of various materials.

It is also an object of this invention to provide an adhesive cement that will not set or harden but will on the contrary remain viscous and plastic and will not shrink, crack, or fall out, while possessing sufficient adhesiveness to hold tiles and the like surface sections permanently in their required positions.

My invention also comprises the method by which I treat the ingredients used in producing my adhesive cement and the steps taken in my process.

With these and other objects in view my invention will be described in several preferred forms, it being understood that my formula and method contemplates the use of equivalent proportions and ingredients, where these are available and suitable for use, as well as those utilized in the manner set forth.

In general my invention involves the use of fatty acid glycerides which are non-drying compounded with or without a wax and a metallic soap dissolved in a suitable hydro-carbon vehicle such as paraffin oil. The metallic soap imparts body to the product. To this composition is added a material to increase the adhesiveness such as rosin oil that is fluid and sticky or a viscous grade of coumarone resin. Variable quantities of inert fillers composed of a mixture of a fibrous material such as asbestos fibres and a powdered substance such as soapstone, clay, talc or the like may then be added. Organic fibrous or powdered materials may also be used.

Specifically practicing the invention I compound with tallow a substance which will keep its consistency through changes of climate and be waterproof, and a constituent which will increase the adhesiveness. With this as a base I incorporate a mixture of asbestos fibres and powdered soapstone.

In a preferred form I make use of the following formula:

| | Parts by weight |
|---|---|
| Tallow | 340 |
| Aluminum oleate | 85 |
| Mineral oil | 85 |
| Rosin oil | 85 |
| Asbestos fibres | 170 |
| Powdered soapstone | 340 |

The mineral oil and aluminum oleate are heated together at a temperature of 165° C., stirring until thoroughly blended. The rosin oil is then added and when the product is uniform, the tallow is added, mixing and heating continually to a homogeneous mass, whereupon it is added to an intimate mixture of asbestos fibres and powdered soapstone contained in a mixing machine and thoroughly incorporated with said fillers.

Other formulas which have produced a very successful product insofar as the desirable qualities are concerned are as follows:

| | Parts by weight |
|---|---|
| Tallow | 340 |
| Aluminum oleate | 50 to 100 |
| Mineral oil | 50 to 100 |
| Rosin oil | 50 to 100 |
| Mineral fillers | 400 to 1000 |

The above ingredients are subjected to the same process disclosed in the first preferred form.

A third form:

| | Parts by weight |
|---|---|
| Tallow | 340 |
| Aluminum oleate | 50 to 100 |
| Mineral oil | 50 to 100 |
| Coumarone resin | 50 to 100 |
| Mineral fillers | 400 to 1000 |

These are also treated similarly to the materials used in the first described form of the invention.

I have also found that on remixing after cooling, the product is even more workable.

When my cement is to be used as a sealing compound, I have obtained a very satisfactory product under the following formula:

| | Parts by weight |
|---|---|
| Tallow | 20 |
| Aluminum oleate | 5 |
| Mineral oil | 5 |
| Paraffin wax | 5 |
| Asbestos fibres | 20 |
| Soapstone | 30 |

The above constituents are compounded similarly to the process outlined in conjunction with the description of the first form of my invention.

In presenting these specific examples of my invention I do not wish to be limited to the exact proportions stated as the same can be varied considerably to obtain products of desirable properties, nor to any specific kind of tallow, metallic soap or other oils or resinous substances or fillers; it being understood that these specifications are intended to cover any similar materials which will give similar results.

It is thus seen that I have provided a waterproof, non-corrosive cement that will be of uniform consistency throughout changing climatic conditions and that will be workable over long periods of time, and particularly will adhere well to surfaces of various materials.

A cement made as above described does not set or harden but remains plastic and retains its original degree of consistency. It is easily worked by hand or with the proper tools and undergoes no changes as respects its condition or volume with variations in weather or climate. It possesses enough adhesiveness to enable tiles to be attached to surfaces of many different kinds without requiring said surfaces to be first processed to put them into more favorable condition to enable the cement to retain the tiles in place. Owing to the fact that the cement does not harden or shrink but always remains plastic and somewhat viscous, it does not crack as often happens with ordinary cement or plaster which sets and becomes dry and afterwards develops fissures so that soon pieces begin to fall out. Also while holding the tiles very firmly, the cement, owing to the fact that it does not set in the ordinary way, more readily permits repairs and replacements. In case of damage to any particular tile the cement allows the damaged unit to be quickly taken out and another substituted, while all the tiles are held on as securely as by ordinary cement which undergoes a hardening transformation.

I claim:

1. A non-setting cement comprising approximately 340 parts by weight of tallow, between 50 and 100 parts each of mineral oil, aluminum oleate, and rosin oil, and between 400 to 1000 parts of inert filling material.

2. The non-hardening cement according to claim 1 containing wax in place of and in approximately the same amount as the rosin oil.

3. A non-setting cement consisting of approximately 340 parts by weight of tallow, and 50 to 100 parts by weight each of mineral oil, aluminum oleate and coumarone resin, together with 400 to 1000 parts of mineral filler.

4. A non-hardening cement comprising the combination of approximately 340 parts by weight of tallow, between 50 to 100 parts each of aluminum oleate and mineral oil, between 50 and 100 parts each of a substance consisting of one of a group consisting of rosin oil, coumarone resin and paraffin wax, and between 400 to 1,000 parts of inert filling material.

SILVIO PELLERANO.